United States Patent
Moestrup Rasmussen (10) Patent No.: US 10,297,989 B2
(45) Date of Patent: May 21, 2019

(54) CABLE ENGINE MODULE FOR CONVEYING CABLES OR PIPES

(71) Applicant: P.K. JEPPESEN & SØN A/S, Næstved (DK)

(72) Inventor: Anders Moestrup Rasmussen, Roskilde (DK)

(73) Assignee: P.K. JEPPESEN & SØN A/S, Næstved (DK)

( * ) Notice: Subject to any disclaimer, the term of this patent is extended or adjusted under 35 U.S.C. 154(b) by 0 days.

(21) Appl. No.: 15/578,304

(22) PCT Filed: May 31, 2016

(86) PCT No.: PCT/EP2016/062306
§ 371 (c)(1),
(2) Date: Nov. 30, 2017

(87) PCT Pub. No.: WO2016/193270
PCT Pub. Date: Dec. 8, 2016

(65) Prior Publication Data
US 2018/0145488 A1    May 24, 2018

(30) Foreign Application Priority Data
Jun. 3, 2015  (EP) .................................. 15170467

(51) Int. Cl.
*F16L 1/20*  (2006.01)
*F16L 3/00*  (2006.01)
(Continued)

(52) U.S. Cl.
CPC .............. *H02G 1/06* (2013.01); *B65H 51/14* (2013.01); *F16L 1/123* (2013.01)

(58) Field of Classification Search
CPC ....... B21B 39/006; B21D 43/09; B21D 43/11; B23K 3/08; B23K 9/125; B23K 9/1336;
(Continued)

(56) References Cited

U.S. PATENT DOCUMENTS 3,310,210 A * 3/1967 Reib ..................... B29C 47/34
226/1
3,459,354 A * 8/1969 Pittman ................... E03F 9/002
226/177

(Continued)

FOREIGN PATENT DOCUMENTS

| JP | 407131912 A | 5/1995 |
|----|-------------|--------|
| JP | 2003291885 A | 10/2003 |

OTHER PUBLICATIONS

Mgr Fluid Power Ltd: "Modular Cable Engines", Dec. 31, 2013, Retrieved from the Internet: http://www.mgrfluidpower.co.uk/wordpress/wp-content/uploads/2013/10/Modular-Cable-Engines.pdf.

(Continued)

*Primary Examiner* — Benjamin F Fiorello
*Assistant Examiner* — Edwin J Toledo-Duran
(74) *Attorney, Agent, or Firm* — Ziegler IP Law Group, LLC (57) ABSTRACT

A cable engine module for conveying cables or pipes includes a frame, traction wheels, and drive means for driving the traction wheels. The frame has a longitudinal direction between a first and second longitudinal end, a traverse direction between a first side, a second side, and a front side. The frame supports the traction wheels on the front side of the frame, and the traction wheels are spaced apart in the longitudinal direction of the frame and convey a cable or pipe in the transverse direction. The frame is provided with first connection means on the first side of the frame and second connection means on the second side of (Continued)

the frame. The first connection means are attached to a second connection means of an identical cable engine module, and the second connection means are attached to a first connection means of an identical cable engine module.

13 Claims, 3 Drawing Sheets (51) Int. Cl.
*F16L 1/235* (2006.01)
*H02G 1/06* (2006.01)
*B65H 51/14* (2006.01)
*F16L 1/12* (2006.01)

(58) Field of Classification Search
CPC ........ B63B 35/03; B65H 20/02; B65H 51/10; B65H 2220/01; B65H 2701/31; E02F 5/104; E02F 5/105; F16L 1/00; F16L 1/12; F16L 1/166; F16L 1/20; F16L 1/205; F16L 1/23; F16L 1/235; F16L 1/24; F16L 1/26; G03D 3/132; G11B 15/26; G11B 15/28; G11B 15/29; G11B 15/50; H02G 1/06
USPC .......... 226/108, 168–194; 61/72.3; 188/72.5; 405/168.3, 168.4
See application file for complete search history.

(56) References Cited

U.S. PATENT DOCUMENTS

| | | | | |
|---|---|---|---|---|
| 3,473,715 | A * | 10/1969 | Shuey, Jr. | F16L 1/23 226/108 |
| 3,506,174 | A * | 4/1970 | Shuey, Jr. | F16L 1/203 226/108 |
| 3,658,222 | A * | 4/1972 | Dressel | F16L 1/23 226/108 |
| 3,715,068 | A * | 2/1973 | Clarke | B65H 51/10 226/108 |
| 3,866,882 | A * | 2/1975 | Willm | B65H 51/14 226/172 |
| 3,889,798 | A * | 6/1975 | Jurgens | B65G 35/00 198/624 |
| 4,049,170 | A * | 9/1977 | Kawakami | E02B 15/08 226/74 |
| 4,343,420 | A * | 8/1982 | Scott | B65H 75/362 226/127 |
| 4,434,926 | A * | 3/1984 | Paoli | B65H 20/16 226/172 |
| 4,521,132 | A * | 6/1985 | Isakson | F16L 1/23 226/108 |
| 4,655,291 | A * | 4/1987 | Cox | E21B 19/22 166/385 |
| 4,700,875 | A * | 10/1987 | Fabris | B21B 39/165 226/176 |
| 4,810,132 | A * | 3/1989 | Diehl | F16L 1/23 226/195 |
| 5,109,598 | A * | 5/1992 | Koch | B65H 51/14 226/171 |
| 5,497,928 | A * | 3/1996 | Burns | B21F 23/002 226/108 |
| 5,624,207 | A * | 4/1997 | Berges | B63B 35/04 405/173 |
| 5,775,417 | A * | 7/1998 | Council | B65H 51/14 166/77.3 |
| 5,839,613 | A * | 11/1998 | Marcout | F16L 55/165 226/176 |
| 5,893,682 | A * | 4/1999 | Oliveri | F16L 1/225 405/166 |
| 6,189,758 | B1 * | 2/2001 | Cherix | B65H 51/14 198/626.6 |
| 6,557,742 | B1 * | 5/2003 | Bobeczko | B21F 23/002 226/177 |
| 6,814,271 | B1 * | 11/2004 | Parmanen | F16H 57/12 226/188 |
| 7,765,685 | B2 * | 8/2010 | Brown | B23K 31/02 29/819 |
| 9,630,801 | B2 * | 4/2017 | Barnes | B08B 9/0433 |
| 2008/0041909 | A1 * | 2/2008 | Waitlevertch | B65H 51/10 226/181 |

OTHER PUBLICATIONS

Specialised Force PTY. LTD. "Light weight underground cable roller", May 15, 2008, Retrieved from the Internet: http://www.specialisedforce.com.au/downloads/products/Lancier_14211_Roller_Cage_15-05-08.pdf.
"NADH Wire Straightener", Jul. 31, 2012, Retrieved from the Internet: http://www.wirestraightener.com/specs/NADH.pdf.
European Search Report, Application No. 15170467, dated Sep. 18, 2015, 1 page.
International Search Report, Application No. PCT/EP2016/062306, dated Jul. 9, 2016, 3 pages.
Communication Pursuant to Article 94(3) EPC, Application No. 15170467.3, dated Jul. 24, 2017, 2 pages.
European Patent Office, Opinion, Application No. 15170467.3, dated Jul. 24, 2017, 6 pages.

* cited by examiner

CABLE ENGINE MODULE FOR CONVEYING CABLES OR PIPES

FIELD

The aspects of the disclosed embodiments enclosed relate to a cable engine module for conveying cables or pipes. The aspects of the disclosed embodiments further relate to a cable engine system assembled from a plurality of such cable engine modules.

BACKGROUND

Cable engines, also called cable tensioners, are used for moving or conveying elongated circular elements, such as land cables, submarine cables, or offshore pipes.

The cable engines allow the cable or pipes to be hauled in at a controlled rate and are used for transportation between the manufacturing process, the storage process, and the layout of the cables or pipes. Often, it is necessary to use different sizes of cable engines having different pulling force for the different steps. For instance, it may be necessary to use one type of cable engine for arranging the cables on large spools, and second type of cable engine to lay out the cables in for instance a seabed. Further, existing cable engines have the disadvantage that they can only be arranged in a fixed configuration for linear conveying of the cable or pipe. This means that several different sizes of cable engines may have to be used in for instance a setup on a cable-laying ship, such as a number of first cable engines for conveying the cable in a linear fashion, and a number of second cable engines for conveying the cable in a curve, e.g. passing an obstacle, such as the ship railing.

MGR Fluid Power has developed a modular cable engine system, capable of driving up to three wheel sets from one hydraulic system. Drive wheel modules may be bolted together in the system. However, the system is inflexible and difficult to customise the specific needs, e.g. to convey cable or pipes along a curve or to function as a stand-alone.

Accordingly, there is a need for a flexible cable engine solution that can be customised and modified to the specific need. It is an object of the invention to obtain a cable engine device, which overcome or ameliorate at least one of the disadvantages of the prior art or which provides a useful alternative.

SUMMARY

This is according to the aspects of the disclosed embodiments achieved by a cable engine module for conveying cables or pipes, wherein the cable engine module comprises a frame, a pair of traction wheels, and drive means for driving the traction wheels, wherein the frame has a longitudinal direction between a first longitudinal end and a second longitudinal end, a traverse direction between a first side and a second side, as well as a front side, wherein the frame supports the pair of traction wheels on the front side of the frame, and the pair of traction wheels are spaced apart in the longitudinal direction of the frame and being adapted to convey a cable or pipe in the transverse direction, wherein the frame is provided with first connection means on the first side of the frame and provided with second connection means on the second side of the frame, wherein the first connection means are configured to be attached to a second connection means of an identical cable engine module, and the second connection means are configured to be attached to a first connection means of an identical cable engine module.

Thus, the cable engine module is configured such that a cable engine system may be assembled from a plurality of cable engine modules arranged mutually spaced in the transverse direction (or in the conveying direction). Accordingly, the cable engine system may be modular configured to accommodate the particular needs, e.g. for a laying out a particular type of submarine cable and to provide the necessary level of pull. Thus, the modular system may be customised on site and alleviates the need for providing bulky system solutions for each type of cable or pipe to be conveyed or for each of the processes from manufacture to the layout of said cable.

It is clear that the connection means are arranged and configured such that when two cable engine modules are attached to each other the traction wheels of the two cable engine modules are aligned with each other in order to provide an increased pulling force. Thereby, the two modules may cooperate to convey a cable or pipe in linear or curved fashion.

In a preferred embodiment, the cable engine module comprises a single traction wheel pair only. This provides the most flexible modular system, where the pull of the assemble system can be configured to the specific need.

While denoted cable engine module, it is clear that the invention is suitable for conveying pipes as well. In general, the cable engine module refers to a module that is configured for conveying elongated, circular objects, often having a length in excess of 1,000 meters.

In an advantageous embodiment, the first connection means and the second connection means are configured such that an angle between attached cable engine modules may be varied. This allows the cable engine modules to be interconnected to an assembled cable engine system, where the cable engine modules are arranged juxtaposed or in a tandem fashion for conveying the cable or pipe in a linear fashion, and in an angled configuration, whereby the cable or pipe may safely be conveyed in a curve.

In another advantageous embodiment, the first connection means comprises a first primary connection means at or near the first longitudinal end of the frame and a first secondary connection means at or near the second longitudinal end of the frame, and wherein the second connection means comprises a second primary connection means at or near the first longitudinal end of the frame and a second secondary connection means at or near the second longitudinal end of the frame. This allows adjacent modules to be directly attached via the primary connection means only, the secondary connection means only or via both the primary connection means and the secondary connection means. This in turn provides a simple solution for attaching adjacent modules with a mutual positive angle by directly connecting the primary connection means only, a mutual negative angle by directly connecting the secondary connection means only, or in a straight connection by directly connecting both the primary and secondary connection means.

Throughout the specification, there is referred to "connection means". It is clear from the description that the connection means may be attachment devices or attachment parts, which are configured to connect adjacent cable engine module. In general, the term refers to any configuration, which is specifically designed to provide the connection between two adjacent cable engine modules.

However, in principle, it is also possible to obtain a cable engine module that can be attached to an identical cable engine module via a single connection means, e.g. via connection means arranged on centre portions of the sides of the frame. However, by using primary and secondary connection means a more rigid connection between juxtaposed modules may be obtained.

The first connection means and second connection means may advantageously be hinge connection parts. This provides a particular simple solution for varying the angle of the connection and thereby the angular orientation of interconnected cable engine modules.

The first connection means and the second connection means may for instance be a mating connection. The first connection means may comprise a pin or shaft, and the second connection may comprise a bore or for instance be a bushing, or vice versa. The pin and bushing may form a pivotable connection. The pin or shaft may be locked to the bore or bushing via a locking pin.

The connection means may be provided as pairs on the frame. For a frame having a front base plate and a rear base plate, the connection means may for instance be provided with a front connection means at the front base plate and a rear connection means at the rear base plate. Accordingly, the hinge parts may be provided as hinge pair parts.

In an advantageous embodiment, the drive means comprises a first drive means for driving a first traction wheel of the pair of traction wheels, and a second drive means for driving a second traction wheel of the pair of traction wheels. Thereby, it is ensured that the module does not exert uneven forces to opposing diameters of a cable or pipe being conveyed, thus minimising the risk of damaging said cable or pipe.

In a highly advantageous embodiment, the first drive means and the second drive means are individually adjustable so that a drive speed of the first traction wheel and a drive speed of the second traction wheel may be individually set. Accordingly, the drive speed of the two drive means may be set to the same speed in a linear configuration, or with different speeds, if assembled cable engine modules are arranged in a curved configuration, such that the speed of the inner traction wheels are set to a lower drive speed that the outer traction wheels. Thereby, it is possible to exert the same force on the opposite diameters of a cable or pipe being conveyed, which in turn minimises the risk of damaging the cable or pipe.

The drive means may advantageously comprise one or more motors, e.g. a hydraulic powered motor or an electrically powered motor. However, any kind of drive means is in principle applicable.

The cable engine module may comprise a control module, such as a PLC, so that the cable engine module may be programmed and/or controlled separately. The control module or PLC may for instance be configured to be programmed remotely. When the modules are assembled in a cable engine system, the individual modules may be programmed and/or controlled separately, or the modules may be controlled together as a system.

In one embodiment, the drive means are arranged in the frame of the cable engine module. The frame may for instance form a housing, in which case the drive means, e.g. the motors, are arranged within the housing. The frame or housing may for instance comprise a first side plate, a second side plate, as well as a front base plate and a rear base plate, said plates surrounding the drive means. The drive means may for instance be rigidly connected, e.g. bolted to the front base plate and/or the rear base plate.

The pair of traction wheels may comprise tires, e.g. pneumatic tires. Thereby, the traction wheels may resiliently engage a cable or pipe being conveyed by the cable engine module, thereby minimising the risk of damage to the cable or pipe.

In yet another advantageous embodiment, the cable engine module further comprises bias means, e.g. hydraulic bias means, for resiliently biasing the pair of drive wheels towards each other in the longitudinal direction. This hydraulic bias means may for instance be provided in form of a hydraulic ram or the like. The hydraulic bias means may be provided with a pressure release valve to cause the hydraulic bias means to exert a constant predetermined pressure towards the opposing diameters of a cable or pipe being conveyed.

The first traction wheel of the pair of traction wheels may for instance be arranged on a linear stage so that the position of the first traction wheel may be moved linearly in the longitudinal direction of the frame, and the second traction wheel may be stationary fixed relative to the frame. The first traction wheel may for instance be translational biased by use of the afore-mentioned bias means. It is clear that the first drive means may be moved along with the first traction wheel i.e. be translationally movable relative to the frame.

In principle, it is also possible to let both traction wheels be translationally arranged on the frame.

The cable engine module may be configured such that the spacing between the pair of traction wheels may be varied between 0 and 500 mm.

In one advantageous embodiment, the cable engine module further comprises one or more support rollers for supporting a cable or pipe being conveyed by the cable engine module. A roller axis of the least one or more support rollers may advantageously be oriented in the longitudinal direction of the frame.

In another advantageous embodiment, the cable engine module comprises a first support roller at the first side of the frame and/or a second support roller at the second side of the frame.

The one or more support rollers may advantageously be adjustable in height relative to the frame. Thereby, it is possible to adjust the position of the support rollers and align a particular cable or pipe in relation to the traction wheels.

In another advantageous embodiment, the cable engine module may comprise a second set of guide rollers that are aligned perpendicular to the first set of guide rollers, i.e. oriented in direction between the front and the rear of the frame (or equivalently along the height of the frame. This provides additional means for aligning the cable or pipe in relation to the traction wheels.

In one embodiment, the cable engine module may be configured to provide between 500 kg and 3,000 kg pull, advantageously between 1000 kg and 2500 kg pull, e.g. around 2000 kg pull.

In another embodiment, an outer diameter of the pair of traction wheels is between 25 cm and 100 cm, advantageously between 40 cm and 80 cm, more advantageously between 50 cm and 70 cm, e.g. around 62 cm.

In yet another embodiment, a transverse width of the module is between 10% and 50% larger than the outer diameter of the traction wheels, advantageously 20%-40% and e.g. approximately 30% larger than the outer diameter of the traction wheels. Accordingly, the width of the module (and accordingly also the mutual spacing between adjacent modules in an assembled system) may be around 80 cm.

Thereby, it is possible to assemble modules in a juxtaposed configuration, where the traction wheels are arranged very near each other, which in turn provides a compact assembled cable engine system.

Each of the traction wheels may be provided with a brake, such as a disc brake.

The aspects of the disclosed embodiments also provide a cable engine system assembled from a plurality of cable engine modules according to any of the previous embodiments and comprising at least a first cable engine module and a second cable engine module. As previously mentioned, the modules may be assembled such that the first connection means of the first cable engine module is attached to the second connection means of the second cable engine module.

In one embodiment, first primary connection means and first secondary connection means of the first cable engine module are configured to be directly attached to second primary connection means and second secondary connection means of the second cable engine module, respectively. This provides a simple compact setup for conveying cable or pipes in a linear direction.

In another embodiment, first primary connection means of the first cable engine module are configured to be directly attached to second primary connection means of the second cable engine module, and first secondary connection means of the first cable engine module is attached to second secondary connection means of the second cable engine module via a spacer, or vice versa. This provides a simple compact setup for altering the angle between adjacent module and conveying cable or pipes in a curved direction.

The spacer may for instance be chosen from the group of a fixed length spacer, a turnbuckle, and a strainer. However, any suitable spacer may be used.

The aspects of the disclosed embodiments also provide a kit of part comprising a plurality of cable engine modules and means for connecting the cable engine modules. The kit of parts may further comprise spacers for attachment between adjacent cable engine modules.

The cable engine modules and the spacer may be configured such that it is possible to set an angle between adjacent modules to at least 10 degrees, or at least 15 degrees, or at least 20 degrees, advantageously at least 22.5 degrees. In other words, the angle between modules may be varied between 0 degrees and e.g. at least 22.5 degrees depending on the needed curve.

BRIEF DESCRIPTION OF THE FIGURES

The aspects of the disclosed embodiments are explained in detail below with reference to embodiments shown in the drawings, in which.

DETAILED DESCRIPTION

Figure 1A:
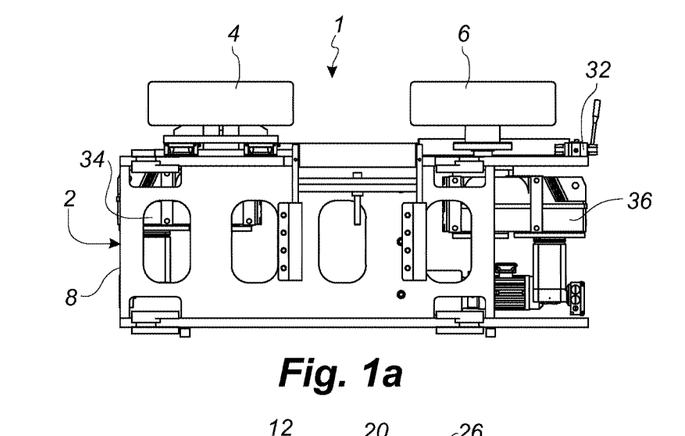
FIGS. 1a-1d shows a cable engine module according to the present disclosure.
Figures 1B, 1D:
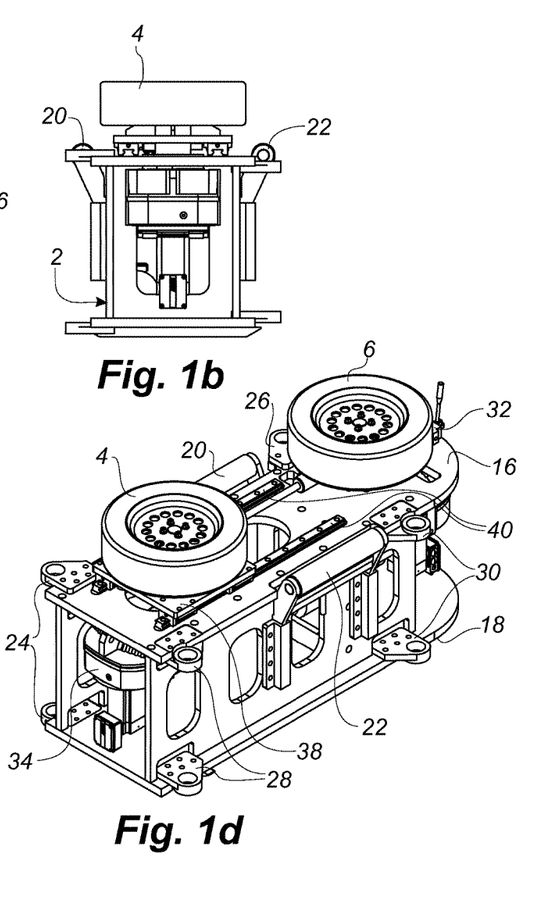
Figure 1C:
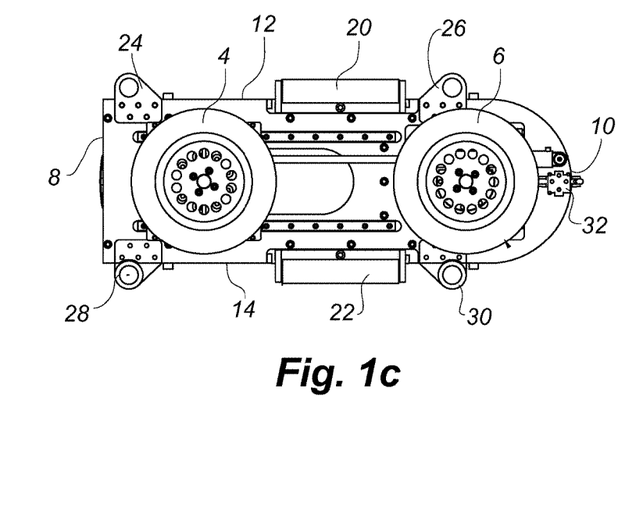

FIG. 1 shows a cable engine module 1 (also called a cable tensioner module) according to the invention, where FIG. 1a shows a side view of the cable engine module 1, FIG. 1b shows an end view of the cable engine module 1, FIG. 1c shows a top view of the cable engine module 1, and FIG. 1d shows the cable engine module 1 in perspective. The cable engine module 1 is configured for conveying elongated, circular objects often having a length in excess of 1,000 meters.

The cable engine module 1 comprises a frame 2. The frame 2 comprises a first side plate at a first side 12 of the frame 2, a second side plate at a second side 14 of the frame 2, a front base plate at a front side 16 of the frame 2, and a rear base plate at a rear side 18 of the plate 2, said plates together forming a housing. The frame 2 has a longitudinal direction extending between a first longitudinal end 8 and a second longitudinal end 10, and a traverse direction extending between the first side 12 and the second side 14.

A pair of traction wheels consisting of a first traction wheel 4 and a second traction wheel 6 is arranged on the front base plate. The first traction wheel 4 and the second traction wheel 6 are spaced apart in the longitudinal direction of the frame 2 and are adapted to convey a cable or pipe in the transverse direction of the frame 2.

The frame 2 houses a first drive means 34 in form of a motor for driving the first traction wheel 4 and a second drive means 36 in form of a motor for driving the second traction wheel 6. The motors may for instance be a hydraulic, electric or pneumatic motors. However, in principle any type of drive means is applicable.

The second traction wheel 6 is arranged in a fixed position relative to the frame 2, whereas the first traction wheel 4 is translationally mounted on the frame 2 so that the first traction wheel 4 may be moved linearly in the longitudinal direction of the frame 2. The first traction wheel 4 may be arranged on a linear stage 38, which is movable along tracks 40. Thereby, the first traction wheel 4 may be resiliently biased towards the first traction wheel 4 by use of hydraulic bias means, which is controlled by a hydraulic tensioner 32. The hydraulic bias means ensures that the traction wheels 4, 6 exert a constant predetermined pressure towards the opposing diameters of a cable or pipe being conveyed. The second drive means 36 is preferably arranged such that it is moved along with the linear stage 38.

The cable engine module 1 further comprises a first support roller 20 arranged at the first side of the frame 2 and near the front side 16 of the frame 2, and a second support roller 22 arranged at the second side of the frame 2 and near the front side of the frame 2. The support rollers 20, 22 are adjustable in height relative to the frame 2. Thereby, it is possible to adjust the position of the support rollers 20, 22 and align a particular cable or pipe in relation to the traction wheels 4, 6. The support rollers 20, 22 are oriented with their rotation axes in the longitudinal direction of the frame 2.

The frame 2 is further provided with connection means such that the cable engine module 1 may be attached to an identical cable engine module. Thus, the cable engine module 1 is configured such that a cable engine system may be assembled from a plurality of cable engine modules 1 arranged mutually spaced in the transverse direction (or in the conveying direction). Accordingly, the cable engine system may be modular configured to accommodate the particular needs of an operation, e.g. for a laying out a particular type of submarine cable and to provide the necessary level of pull. Thus, the modular system may be customised on site and alleviates the need for providing bulky system solutions for each type of cable or pipe to be conveyed or for each of the processes from manufacture to the layout of said cable.

The cable engine module 1 may for instance provide 2,000 kg pull. Thus, the cable engine modules 1 may be assembled in accordance with the desired pull. If for instance 6,000 kg pull is needed, three cable engine modules 1 may be assembled, and if 10,000 kg pull is needed, five cable engine modules 1 may be assembled. This provides a flexible, modular system, which has hitherto not been seen in the art.

The connection means are provided in form of hinge pair parts. The frame 2 comprises first primary connection means 24 in form of a hinge pair parts arranged on the first side 12 of the front base plate and the rear base plate, respectively, and near the first longitudinal end 8 of the frame 2, and first secondary connection means 26 in form of a hinge pair parts arranged on the first side 12 of the front base plate and the rear base plate, respectively, and near the second longitudinal end 10 of the frame 2. The frame 2 further comprises second primary connection means 28 in form of a hinge pair parts arranged on the second side 14 of the front base plate and the rear base plate, respectively, and near the first longitudinal end 8 of the frame 2, and second secondary connection means 30 in form of a hinge pair parts arranged on the second side 14 of the front base plate and the rear base plate, respectively, and near the second longitudinal end 10 of the frame 2. The first connection means 24, 26 are configured to be attached to the second connection means of an identical cable engine module, and the second connection means 28, 30 are configured to be attached to a first connection means of an identical cable engine module.

It is not shown, but the first connection means 24, 26 and the second connection means 28, 30 may for instance be configured as a mating connection. The first connection means 24, 26 may comprise a pin or shaft, and the second connection means 28, 30 may comprise a bore or for instance be a bushing, or vice versa. The pin and bushing may form a pivotable connection. The pin or shaft may be locked to the bore or bushing via a locking pin.

It is clear that the connection means 24, 26, 28, 30 are arranged and configured such that when two cable engine modules 1 are attached to each other the traction wheels 4, 6 of the two cable engine modules 1 are aligned with each other. Thereby, the two modules 1 may cooperate to convey a cable or pipe in linear or curved fashion, which will be explained in the following with reference to FIGS. 2 and 3.

Figures 2A, 2B, 2C, 2D:
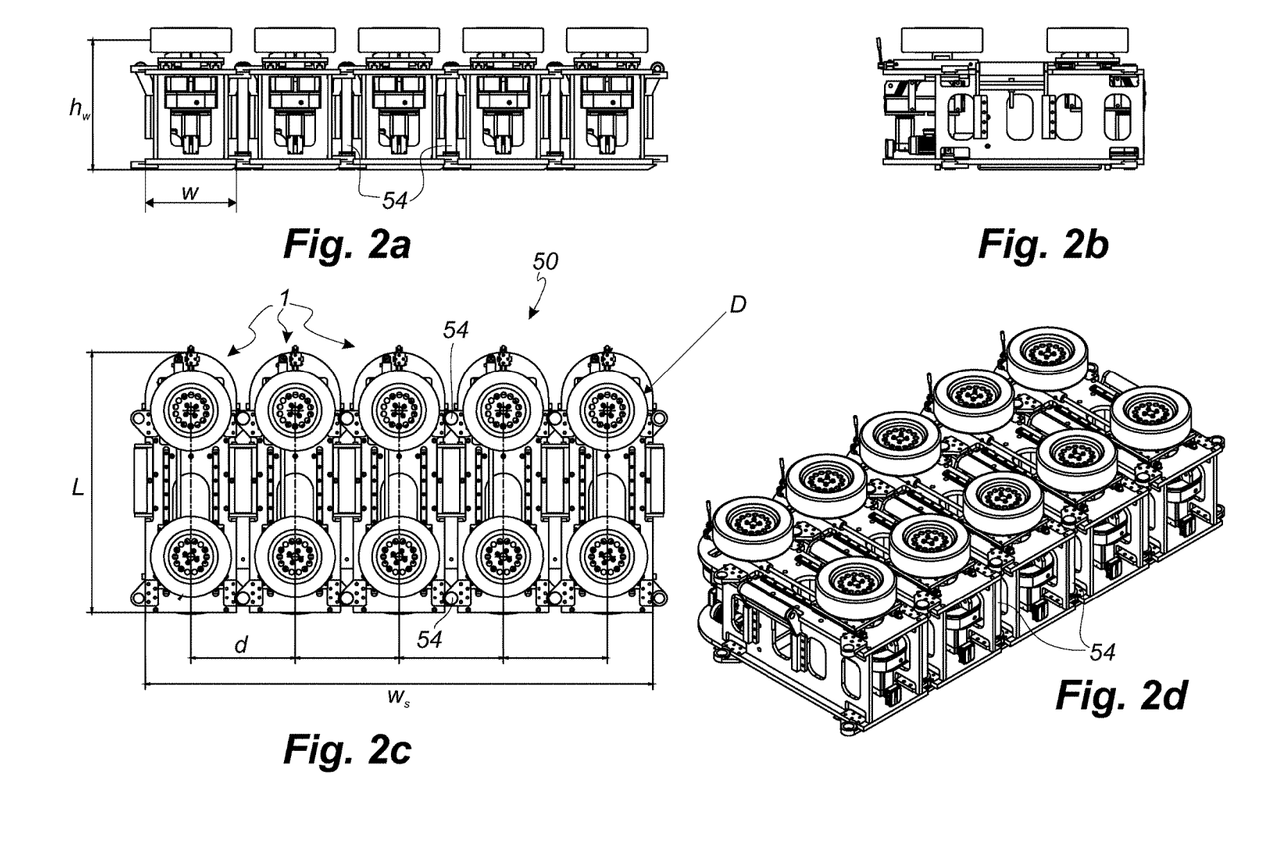
FIGS. 2a-2d shows a cable engine system assembled from a plurality of such cable engine modules in a first configuration.

FIG. 2 shows a first embodiment of a cable engine system 50 according to the invention, where FIG. 2a shows a side view of the cable engine system 50, FIG. 2b shows an end view of the cable engine system 50, FIG. 2c shows a top view of the cable engine system 50, and FIG. 2d shows the cable engine system 50 in perspective.

The cable engine system 50 is assembled from a plurality of cable engine modules 1 according to the invention, and in the shown embodiment the cable engine system 50 is assembled from five cable engine modules 1. In the first embodiment, the cable engine system 50 is assembled such that second connection means of a first cable engine module is directly connected to first connection means of an adjacently arranged cable engine module. The cable engine modules are connected by use of pins or bolts 54 that are connected to the hinge pair parts of the cable engine modules.

The base plates of the frames of the cable engine modules 1 are only slightly wider than the diameter of the traction wheels 4, 6. Since the first connection means 24, 26 and the second connection means 28, 30 are directly connected to the base plates, it is thereby possible to assemble the cable engine modules in a very compact configuration, where the traction wheels 4, 6 of adjacent cable engine modules are arranged close to each other. The spacing between adjacent cable engine modules is thereby only 25-30% larger than the diameter of the traction wheels.

The cable engine modules 1 may comprise a control module, such as a PLC, so that the cable engine modules 1 may be programmed and/or controlled separately. The control module or PLC may for instance be configured to be programmed remotely. When the modules are assembled in a cable engine system, the individual modules 1 may be programmed and/or controlled separately, or the modules may be controlled together as a system.

Figure 3A:
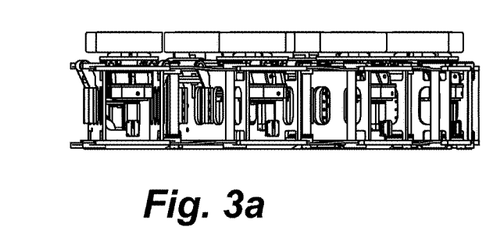
FIGS. 3a-3d shows a cable engine system assembled from a plurality of such cable engine modules in a second configuration.
Figure 3B:
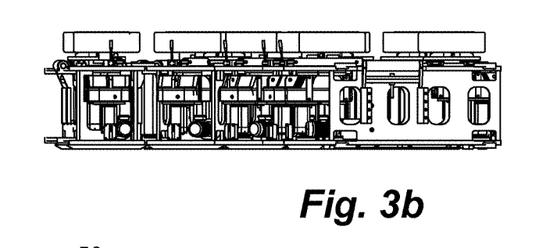
Figure 3C:
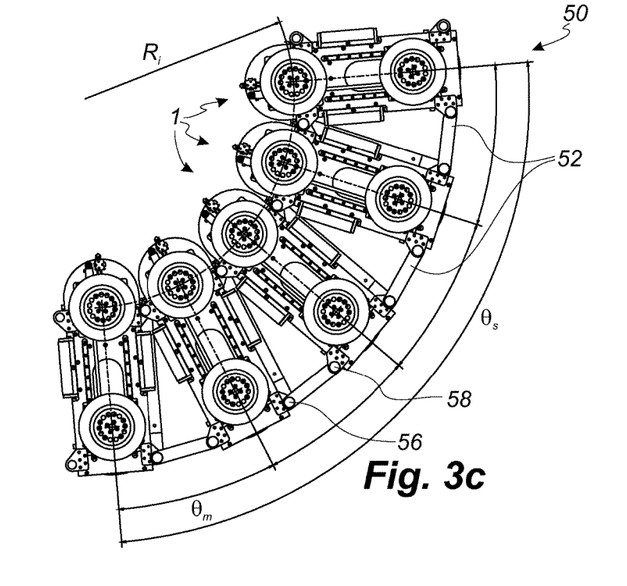
Figure 3D:
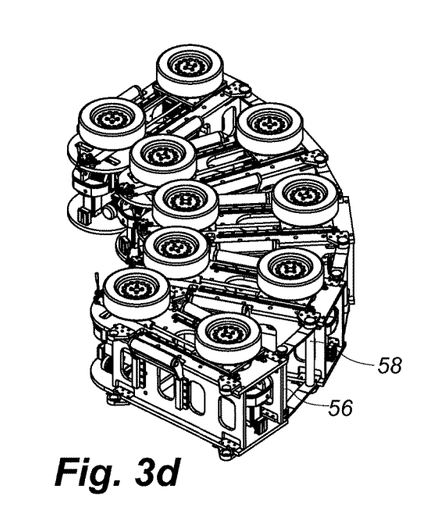

FIG. 3 shows a second embodiment of a cable engine system 50 according to the invention, where FIG. 3a shows a side view of the cable engine system 50, FIG. 3b shows an end view of the cable engine system 50, FIG. 3c shows a top view of the cable engine system 50, and FIG. 3d shows the cable engine system 50 in perspective.

In the second embodiment, the secondary connection means are directly connected, e.g. by use of a pin or bolt through the secondary hinge pair parts, whereas a spacer 52 is arranged between primary connection means of adjacent cable engine modules. The spacer 52 may be attached to the first primary hinge pair parts of a first cable engine module via a first pin or bolt and to the second primary hinge pair parts of an adjacent cable engine module via a second pin or bolt. By using a spacer between the primary connection means or the secondary connection means, it is possible to set the angle between adjacent cable engine modules, such that a cable or pipe may be conveyed by a cable engine system 50 in a curve, thereby being able to bypass for instance obstacles. The cable engine system 50 is still very compact and accordingly the traction wheels of adjacent cable engine modules 1 are arranged close to each other, whereby it is ensured that the cable engine system 50 provides stability via traction through the entire curve, which in turn minimises the risk of damaging the cable or pipe being conveyed by the cable engine system 50.

In the shown embodiment, the cable engine system 50 is assembled from five cable engine modules 1, and the spacers 50 are set to a length, such that the angle between adjacent cable engine modules is 22.5 degrees, whereby the cable engine system 50 in total is configured to convey the cable or pipe along a 90 degrees curve.

The first drive means 34 and the second drive means 36 may be set individually. Accordingly, in the configuration shown in FIG. 3, it is possible to set the drive means 34, 36 such that the second traction wheel 6 is set at a lower speed than the first traction wheel 4. Thereby, it is possible to achieve a lower drive speed at the inner radius of the curve, whereby an even traction may be achieved through the curve The spacers 52 may be a fixed length spacer or may be variable in length, e.g. provided as a turnbuckle, a strainer or the like, whereby it is possible to vary the angle between adjacent cable engine module.

EXAMPLE

The following is an example of design parameters that provide a high degree of modularity and the possibility of obtaining a compact assembled cable engine system:

| Symbol | Definition | Value |
|---|---|---|
| d | Inter-modular spacing | 800 mm |
| D | Diameter of traction wheel | 620 mm |
| h | Frame height | 770 mm minimum |
| $h_w$ | Wheel height | 995 mm |

-continued

| Symbol | Definition | Value |
| --- | --- | --- |
| L | Length | 2000 mm |
| $R_i$ | Inner radius of curve | 1951 mm |
| w | Width of base plate | 700 mm |
| $w_s$ | Width of cable engine system | 3900 mm |
| $\theta_m$ | Angle between modules | 22.5 degrees |
| $\theta_s$ | Overall curvature angle for system | 90 degrees |
| | Pull of cable engine module | 2 tonnes |
| | Minimum spacing between traction wheels | 0 mm |
| | Maximum spacing between wheels | 500 mm |

The present disclosure has been described with reference to advantageous embodiments. However, the scope of the present disclosure is not limited to the illustrated embodiments, and alterations and modifications can be carried out without deviating from the scope of the present disclosure, which is defined by the following claims.

LIST OF REFERENCE NUMERALS

| 1 | Cable engine module/cable tensioner module |
| 2 | Frame/Housing |
| 4 | First traction wheel/First drive wheel (movable/translational) |
| 6 | Second traction wheel/Second drive wheel (stationary) |
| 8 | First (longitudinal) end |
| 10 | Second (longitudinal) end |
| 12 | First (transverse) side |
| 14 | Second (transverse) side |
| 16 | Front side |
| 18 | Rear side |
| 20 | First support roller |
| 22 | Second support roller |
| 24 | First primary connection means/hinge pair |
| 26 | First secondary connection means/hinge pair |
| 28 | Second primary connection means/hinge pair |
| 30 | Second secondary connection means/hinge pair |
| 32 | Hydraulic tensioner |
| 34 | First drive means/motor |
| 36 | First drive means/motor |
| 38 | Linear stage |
| 40 | Tracks |
| 50 | Cable engine system/cable tensioner system |
| 52 | Spacer |
| 54 | Pin/bolt |
| 56 | First pin/bolt |
| 58 | Second pin/bolt |

The invention claimed is:

1. A cable engine module for conveying cables or pipes, wherein the cable engine module comprises a frame, a pair of traction wheels, and drive means for driving the traction wheels, wherein
the frame has a longitudinal direction between a first longitudinal end and a second longitudinal end, a traverse direction between a first side and a second side, as well as a front side, wherein the frame supports the pair of traction wheels on the front side of the frame, and
the pair of traction wheels are spaced apart in the longitudinal direction of the frame and being adapted to convey a cable or pipe in the transverse direction, wherein
the frame is provided with a first connection means on the first side of the frame and provided with a second connection means on the second side of the frame, wherein
the first connection means are configured to be attached to a second connection means of an identical cable engine module disposed on the first side of the cable engine module,
the second connection means are configured to be attached to a first connection means of an identical cable engine module disposed on the second side of the cable engine module; and
wherein the first connection means comprises a first primary connection means and a first secondary connection means,
wherein the second connection means comprises a second primary connection means and a second secondary connection means,
wherein the cable engine module is configured such that a first primary connection means and a first secondary connection means of a first cable engine module can be directly attached to a second primary connection means and a second secondary connection means of a second identical cable engine module, respectively, and
wherein cable engine module is further configured such that the first primary connection means of the first cable engine module can be directly attached to the second primary connection means of the second identical cable engine module, and wherein the first secondary connection means of the first cable engine module can be attached to the second secondary connection means of the second cable engine module via a spacer, or vice versa, such that an angle between the attached first cable engine module and the second cable engine module may be varied.

2. The cable engine module according to claim 1, wherein the first connection means comprises the first primary connection means at or near the first longitudinal end of the frame and the first secondary connection means at or near the second longitudinal end of the frame, and wherein the second connection means comprises the second primary connection means at or near the first longitudinal end of the frame and the second secondary connection means at or near the second longitudinal end of the frame.

3. The cable engine module according to claim 1, wherein the first connection means and the second connection means are hinge connection parts.

4. The cable engine module according to claim 1, wherein the cable engine module comprises a single traction wheel pair.

5. The cable engine module according to claim 1, wherein the drive means comprises a first drive means for driving a first traction wheel of the pair of traction wheels, and a second drive means for driving a second traction wheel of the pair of traction wheels, wherein the first drive means and the second drive means are individually adjustable so that a drive speed of the first traction wheel and a drive speed of the second traction wheel may be individually set.

6. The cable engine module according to claim 1, wherein the drive means are arranged in the frame of the cable engine module.

7. The cable engine module according to claim 1, wherein the cable engine module further comprises a bias means, for resiliently biasing the pair of drive wheels towards each other in the longitudinal direction, wherein a first traction wheel of the pair of traction wheels is arranged on a linear stage so that a position of the first traction wheel is translational in the longitudinal direction of the frame, and a second traction wheel of the pair of traction wheels is stationary and fixed relative to the frame.

8. The cable engine module according to claim 1, wherein the cable engine module further comprises one or more support rollers for supporting a cable or a pipe being conveyed by the cable engine module, wherein a roller axis of the one or more support rollers is oriented in the longitudinal direction of the frame, wherein the cable engine module comprises one or more of a first support roller at the first side of the frame or a second support roller at the second side of the frame.

9. The cable engine module according to claim 8, wherein the one or more support rollers are adjustable in height relative to the frame.

10. A cable engine system assembled from a plurality of cable engine modules according to claim 1 and comprising at least the first cable engine module and the second cable engine module wherein the first primary connection means of the first cable engine module are directly attached to second primary connection means of the second cable engine module, and wherein first secondary connection means of the first cable engine module is attached to the second secondary connection means of the second cable engine module via the spacer, or vice versa.

11. The cable engine system according to claim 10, wherein a first connection means of the first cable engine module is attached to a second connection means of the second cable engine module.

12. The cable engine system according to claim 11, wherein the spacer is chosen from the group of a fixed length spacer, a turnbuckle, and a strainer.

13. The cable engine system according to claim 12, wherein the cable engine modules and the spacer are configured such that it is possible to set an angle between adjacent modules to at least 10 degrees, or at least 15 degrees, or at least 20 degrees, or at least 22.5 degrees.

* * * * *